(12) United States Patent
Watson et al.

(10) Patent No.: US 11,502,638 B2
(45) Date of Patent: Nov. 15, 2022

(54) SOLAR MODULE MOUNTING SYSTEM

(71) Applicant: NEXTracker Inc., Fremont, CA (US)

(72) Inventors: Tyler Joseph Watson, San Francisco, CA (US); Dennis Marvin Lawson, Richmond, CA (US); Thao Thanh Hoang, San Jose, CA (US); Paul Daniel Habib, Nevada City, CA (US)

(73) Assignee: NEXTRACKER LLC, Fremont, CA (US)

( * ) Notice: Subject to any disclaimer, the term of this patent is extended or adjusted under 35 U.S.C. 154(b) by 107 days.

(21) Appl. No.: 15/971,522

(22) Filed: May 4, 2018

(65) Prior Publication Data
US 2019/0341878 A1 Nov. 7, 2019

(51) Int. Cl.
*H02S 20/10* (2014.01)
*H02S 20/32* (2014.01)
(Continued)

(52) U.S. Cl.
CPC ............. *H02S 20/10* (2014.12); *F24S 30/40* (2018.05); *H02S 20/32* (2014.12); *F24S 25/60* (2018.05);
(Continued)

(58) Field of Classification Search
CPC .......... H02S 20/10; H02S 20/32; H02S 20/20; H02S 20/30; H02S 30/00; F24S 30/40;
(Continued)

(56) References Cited

U.S. PATENT DOCUMENTS

| 8,567,134 | B1* | 10/2013 | Grushkowitz | ........... H02S 20/32 52/173.3 |
| 2012/0073219 | A1* | 3/2012 | Zuritis | .................... F24S 25/65 52/173.3 |

(Continued)

FOREIGN PATENT DOCUMENTS

| CN | 104797765 A | 7/2015 |
| CN | 104823376 A | 8/2015 |

(Continued)

OTHER PUBLICATIONS

PCT Search Report and Written Opinion issued in corresponding PCT Patent Application No. PCT/US19/30648 dated Jul. 18, 2019, 12 pages.
(Continued)

*Primary Examiner* — Michael Y Sun
(74) *Attorney, Agent, or Firm* — Weber Rosselli & Cannon LLP (57) ABSTRACT

A solar module mounting bracket system including a plurality of solar modules including mounting slots formed in a sidewall of the solar module, a torque tube configured to support the solar modules such that they can be rotated, a plurality of mounting brackets configured for integration with the torque tube and to which the plurality of solar modules are mounted, at least one first retainer assembly connected to one of the plurality of mounting brackets, the first retainer assembly including a through bolt, a spring, a mounting tab, and nut. When a solar module is placed on the mounting bracket and supported by the torque tube the mounting tab retainer assembly is received in the mounting slot of the solar module.

13 Claims, 13 Drawing Sheets

(51) Int. Cl.
  *F24S 30/40* (2018.01)
  *F24S 25/634* (2018.01)
  *F24S 25/67* (2018.01)
  *H02S 20/20* (2014.01)
  *F24S 25/63* (2018.01)
  *F24S 25/65* (2018.01)
  *H02S 20/30* (2014.01)
  *F24S 25/636* (2018.01)
  *F24S 30/00* (2018.01)
  *F24S 25/60* (2018.01)

(52) U.S. Cl.
  CPC ............. *F24S 25/63* (2018.05); *F24S 25/634* (2018.05); *F24S 25/636* (2018.05); *F24S 25/65* (2018.05); *F24S 25/67* (2018.05); *F24S 2025/6002* (2018.05); *F24S 2025/6005* (2018.05); *F24S 2025/6006* (2018.05); *F24S 2025/6007* (2018.05); *F24S 2025/6008* (2018.05); *F24S 2030/10* (2018.05); *F24S 2030/13* (2018.05); *F24S 2030/15* (2018.05); *H02S 20/20* (2014.12); *H02S 20/30* (2014.12)

(58) Field of Classification Search
  CPC ........ F24S 25/20; F24S 25/632; F24S 30/425; F24S 2030/10; F24S 2025/6005; F24S 2025/6006; F24S 25/60; F24S 2025/6002; F24S 2025/6007; F24S 2025/6008; F24S 2030/15; F24S 2030/13; F24S 25/634; F24S 25/67; F24S 25/63; F24S 25/65; F24S 25/636; Y02E 10/47; Y02E 10/50
  See application file for complete search history.

(56) References Cited

U.S. PATENT DOCUMENTS

| | | | |
|---|---|---|---|
| 2012/0275066 A1 | 11/2012 | O'Brien et al. | |
| 2014/0246549 A1* | 9/2014 | West | H02S 20/30 248/220.22 |
| 2015/0180404 A1* | 6/2015 | Braunstein | H02S 30/10 136/251 |
| 2017/0279405 A1 | 9/2017 | Wares | |
| 2017/0294867 A1 | 10/2017 | Pesce et al. | |
| 2017/0310273 A1 | 10/2017 | Almy et al. | |
| 2018/0062567 A1 | 3/2018 | Oh et al. | |
| 2018/0062569 A1 | 3/2018 | Oh et al. | |
| 2019/0068112 A1* | 2/2019 | Gnanapa | H02S 20/10 |

FOREIGN PATENT DOCUMENTS

| | | |
|---|---|---|
| CN | 105917575 A | 8/2016 |
| FR | 2996384 A1 | 4/2014 |

OTHER PUBLICATIONS

Examination report issued in Australia Patent Application No. 2019262608 dated Jul. 16, 2021, 4 pages.
First Examination Report issued in Indian Patent Application No. 202017047731 dated Dec. 20, 2021, 7 pages.
Chinese Office Action issued in Chinese Patent Application No. 201980030332.5 dated Nov. 2, 2021 including Search Report. English translation not available.
Extended European Search Report issued in European Patent Application No. 19796953.8 dated Dec. 3, 2021.

* cited by examiner

SOLAR MODULE MOUNTING SYSTEM

BACKGROUND

1. Technical Field

The present disclosure relates generally to a system for mounting solar modules. More specifically, the present disclosure relates to retainer assemblies for coupling solar modules to a framework.

2. Background of Related Art

Solar mounting systems are provided to support and couple an array of one or more photovoltaic ("PV") modules to a framework, such as, for example, a plurality of parallel-oriented, rotatable torque tubes. The solar mounting systems are designed to maintain the PV modules in a fixed position relative to the torque tube while the torque tube is rotating during solar tracking.

Solar mounting systems can add significant cost to a solar power system for at least two reasons. First, the components themselves are expensive to manufacture and ship, due in part to their weight and size. Second, installation can be a laborious and time consuming process requiring skilled installers to insure the quality of the installations in the field. Therefore, there is a need for PV mounting systems that are easier and more efficient to package, ship, and install.

SUMMARY

In one aspect of the present disclosure, a solar module mounting bracket system is provided. The solar module mounting bracket system includes a plurality of solar modules including mounting slots formed in a sidewall of the solar module, a torque tube configured to support the solar modules such that they can be rotated, a plurality of mounting brackets configured for integration with the torque tube and to which the plurality of solar modules are mounted, at least one first retainer assembly connected to one of the plurality of mounting brackets, the first retainer assembly including a through bolt, a spring, a mounting tab, and nut. When a solar module is placed on the mounting bracket and supported by the torque tube the mounting tab retainer assembly is received in the mounting slot of the solar module.

In a further aspect of the disclosure, a second retainer assembly is connected to a second of the plurality of mounting brackets, the second retainer assembly including a catch is positioned on the second mounting bracket such that it is received in the slot of a solar module from an interior direction when the solar module is placed on the second mounting bracket, and wherein the catch prevents movement of the solar module in the direction of a closed portion of the catch.

In another aspect of the present disclosure, the system includes a plurality of first retainer assemblies and a single second retainer assembly for a pre-defined section of torque tube. The predefined portion of torque tube may be a length of torque tube between two ground support posts.

In a further aspect of the present disclosure the plurality of mounting brackets include a first mounting bracket having a bottom surface configured for integrating with a first clamp assembly, a top surface configured for integrating with the first retainer assembly, and a threaded U-bolt, wherein the first clamp assembly includes a bottom surface having a radius substantially similar to that of the torque tube, two holes configured to receive the threaded U-bolt, and a locking tab configured to be received into one or more locking holes of the torque tube, wherein at least one first retainer assembly is mounted on the first mounting bracket.

In a further aspect of the present disclosure, the plurality of rails include a second mounting bracket having a top surface with four or more mounting holes, configured for integration with the second retainer assembly, and a bottom surface including a radius substantially similar to that of the torque tube, the bottom surface including a locking tab configured to be received into one or more locking holes of the torque tube, and two or more holes configured to receive a threaded U-bolt, where the at least one second retainer assembly is mounted in the second mounting bracket.

In another aspect of the present disclosure, the plurality of mounting brackets include a third mounting bracket having a top surface including four or more mounting holes, configuring for integrating with the second retainer assembly, and a bottom surface including a radius substantially similar to that of the torque tube, the bottom surface including a locking tab configured to be received into one or more locking holes of the torque tube, and two or more holes configured to receive a threaded U-bold, and where the top surface includes a clamp assembly configured for integrating with a bearing housing assembly, where the at least one second retainer assembly is mounted in the third mounting bracket.

Further details, advantages, and aspects of exemplary embodiments of the present disclosure are described in more detail below with reference to the appended figures.

BRIEF DESCRIPTION OF THE DRAWINGS

Embodiments of the present disclosure are described herein with reference to the accompanying drawings, wherein.

DETAILED DESCRIPTION

The present disclosure, in accordance with various example embodiments thereof, relates to a system for mounting solar modules (e.g., PV modules) to a torque tube of a solar tracker. The system includes a plurality of solar modules, each solar module having mounting slots formed in a sidewall. A torque tube is configured to support the solar modules such that they can be rotated and track the position of the sun. A plurality of mounting brackets are configured for integration with the torque tube and secure the plurality of solar modules to the torque tube. The mounting brackets include retainer assemblies that are received in the slots and secure the solar modules to the rails. When a solar module is placed on the mounting brackets and supported by the torque tube the retainer assembly is received in the mounting slot of the solar module. The retainer assemblies enable efficient installation of the solar modules on the solar tracker. These and further details of the solar power systems and retainer assemblies will be described below.

Embodiments of the presently disclosed solar module mounting system and methods of installing the same are described in detail with reference to the drawings, in which like reference numerals designate identical or corresponding elements in each of the several views. As described herein, the term "solar module" refers to any suitable solar panel or array of solar panels that convert energy from the sun into usable energy. Though generally described with reference to solar tracker systems, the present disclosure is not so limited and can be utilized for any solar module installation.

Figure 1:
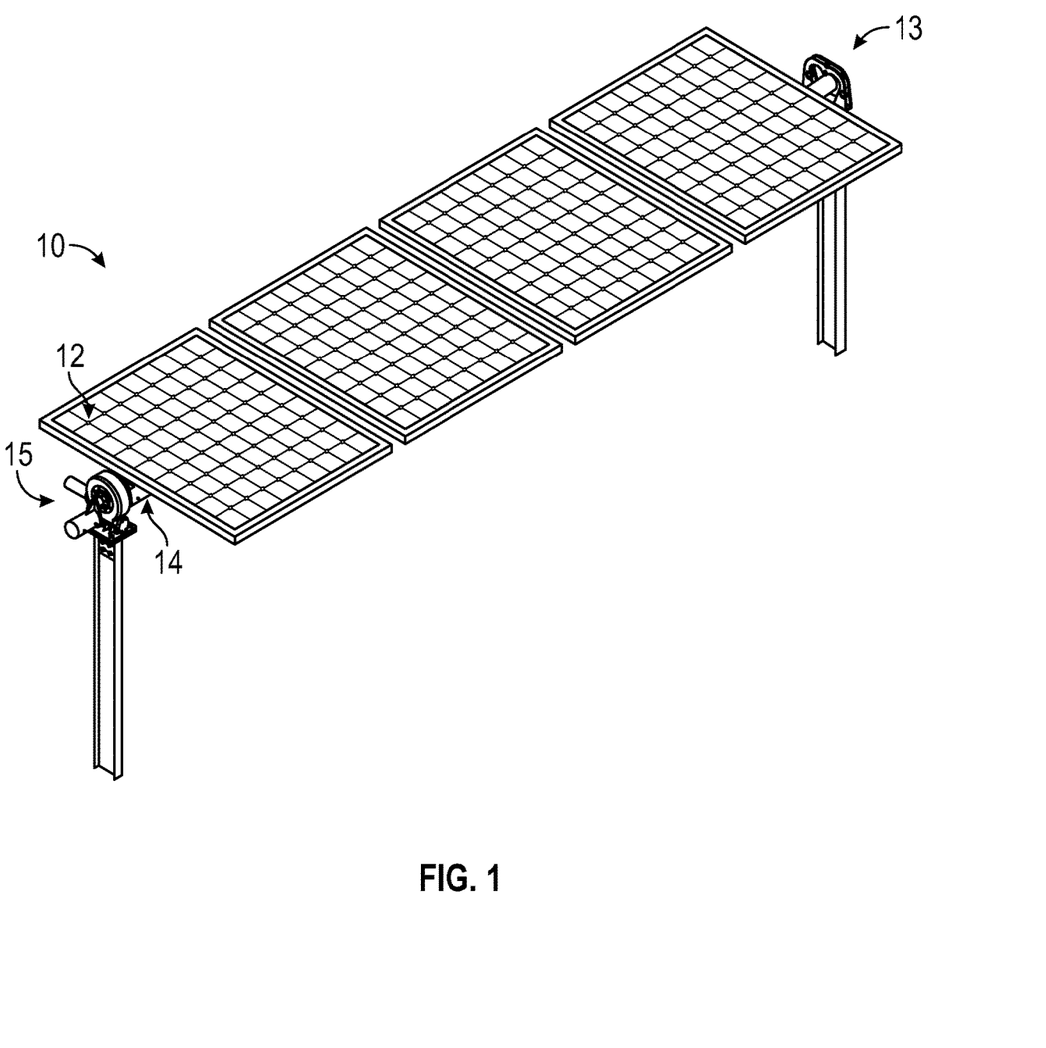
FIG. 1 is a perspective view of a solar tracker system in accordance with an exemplary embodiment of the present disclosure.
Figure 2:
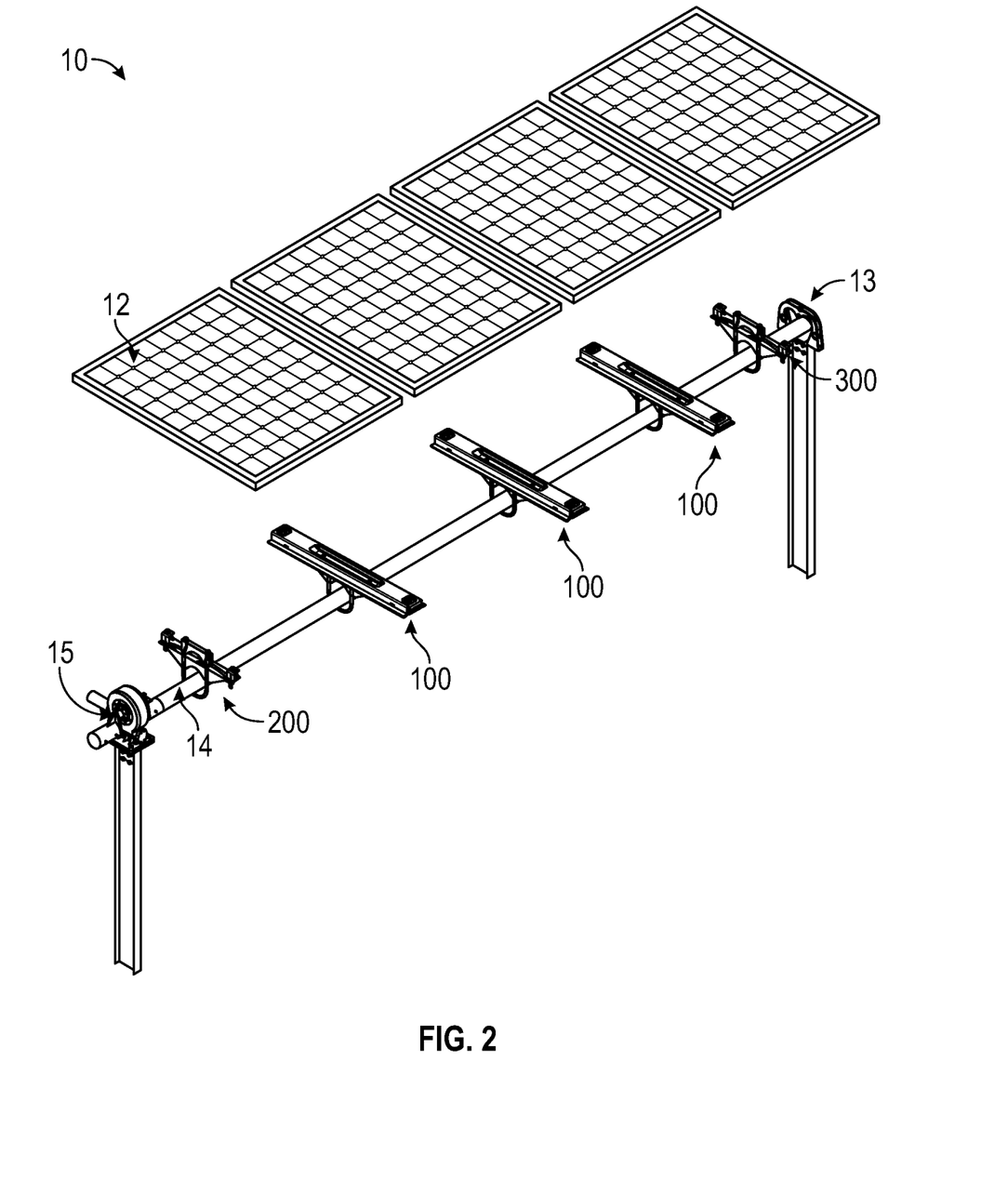
FIG. 2 is an exploded view of the solar tracker system of FIG. 1.

With reference to FIGS. 1 and 2, a solar tracker system 10 is illustrated in accordance with the present disclosure. The solar tracker system 10 generally includes an array of solar modules 12 (e.g., PV modules), a torque tube 14, and mounting brackets 100, 200, 300 for coupling the array of PV modules 12 to the torque tube 14. Each of the mounting brackets 100, 200, 300 may be oriented perpendicularly relative to the torque tube 14 and extend under each the PV modules 12. The torque tube 14 is rotatable about an axis to adjust an angular orientation of the PV modules 12 relative to the sun. The solar tracker system 10 includes a bearing housing assembly (BHA) 13 at one end and slew gear drive 15 at the opposite end. While not illustrated, the system 10 may include more than one torque tube 14, connected either to the slew gear drive 15 or to torque tube 14 via a clamp (not shown). The slew gear drive 15 may be located in the center of a plurality of torque tubes 14, or at one end of the connected torque tubes 14. Though described in connection with a slew driven mechanism, other mechanisms to move the PV modules 12 relative to the sun are considered within the scope of the present disclosure, for example it is contemplated that a multiple actuator system may be used in the alternative to the slew gear drive 15.

FIG. 2 depicts three first mounting brackets 100, one second mounting bracket 200 and one third mounting bracket 300 being utilized to couple four PV modules 12 to the torque tube 14. As depicted, a second mounting bracket 200 is mounted nearest the slew gear drive 15. A solar module 12 is mounted between the second mounting bracket 200 and a first mounting bracket 100. Any number of solar modules 12 may then be mounted between sets of first mounting brackets 100. Finally, on the far end of the torque tube 14, a solar module is mounted between a first mounting bracket 100 and a third mounting bracket 300. This third mounting bracket 300 is positioned closest to the BHA 13.

Figure 3:
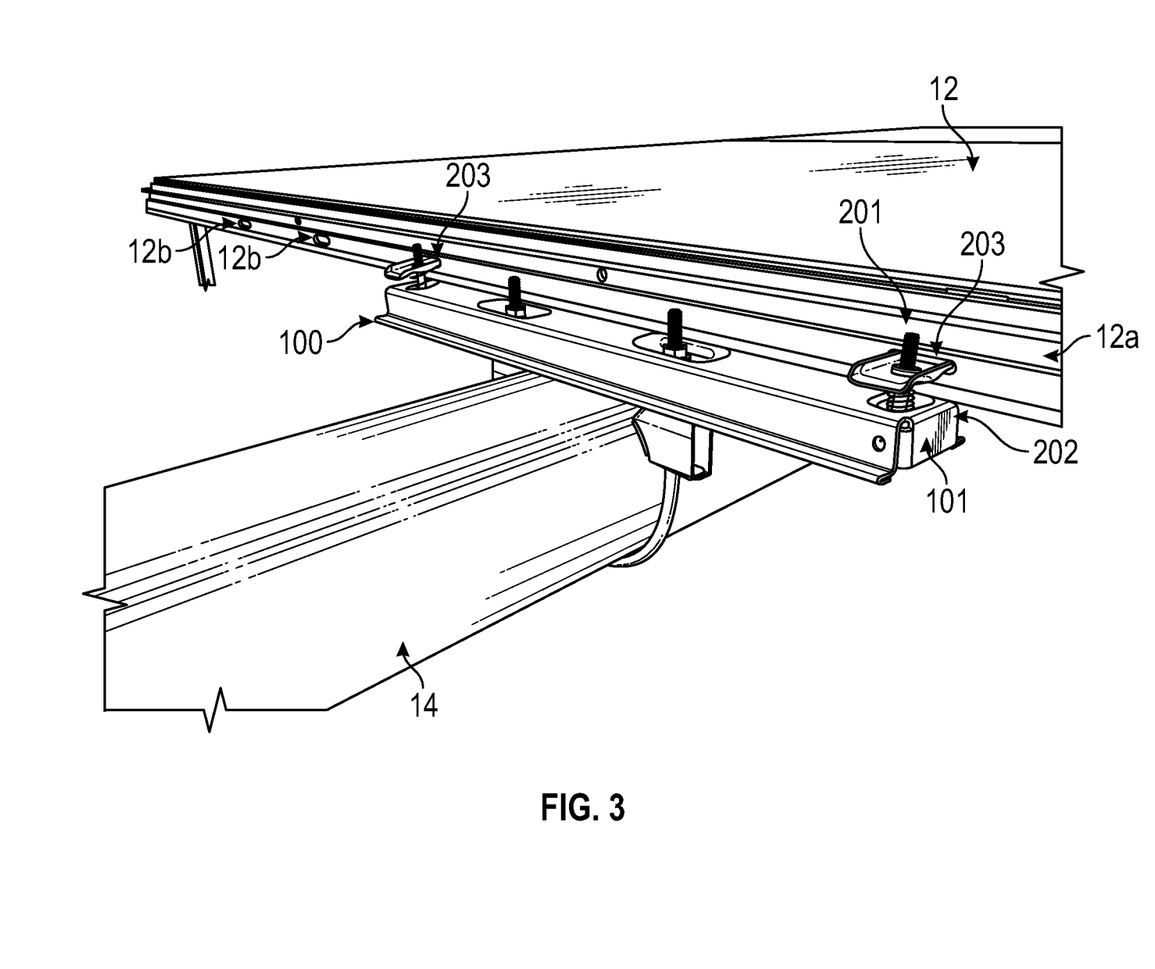
FIG. 3 is a magnified perspective view of a portion of FIG. 2 depicting a first mounting bracket mounted to torque tube and supporting a solar module.

With reference to FIG. 3, an exemplary first mounting bracket 100 is illustrated. The first mounting bracket 100 has a generally rectangular shape. The solar module 12 can include side rails 12a including several mounting slots 12b. Mounting slots 12b of the side rails 12a are configured to receive the retaining tab 203 of the first mounting bracket 100. The retaining tab 203 is presented in more detail in FIG. 7. The mounting slots 12b can be oval in shape; however, it is contemplated that other shapes such as square or round may be utilized. The mounting slots 12b also provide the benefit of providing additional grounding through the metal to metal contact of the locking devices of the mounting brackets 100, 200, 300 and the side rails 12a of the solar modules 12.

Figure 4:
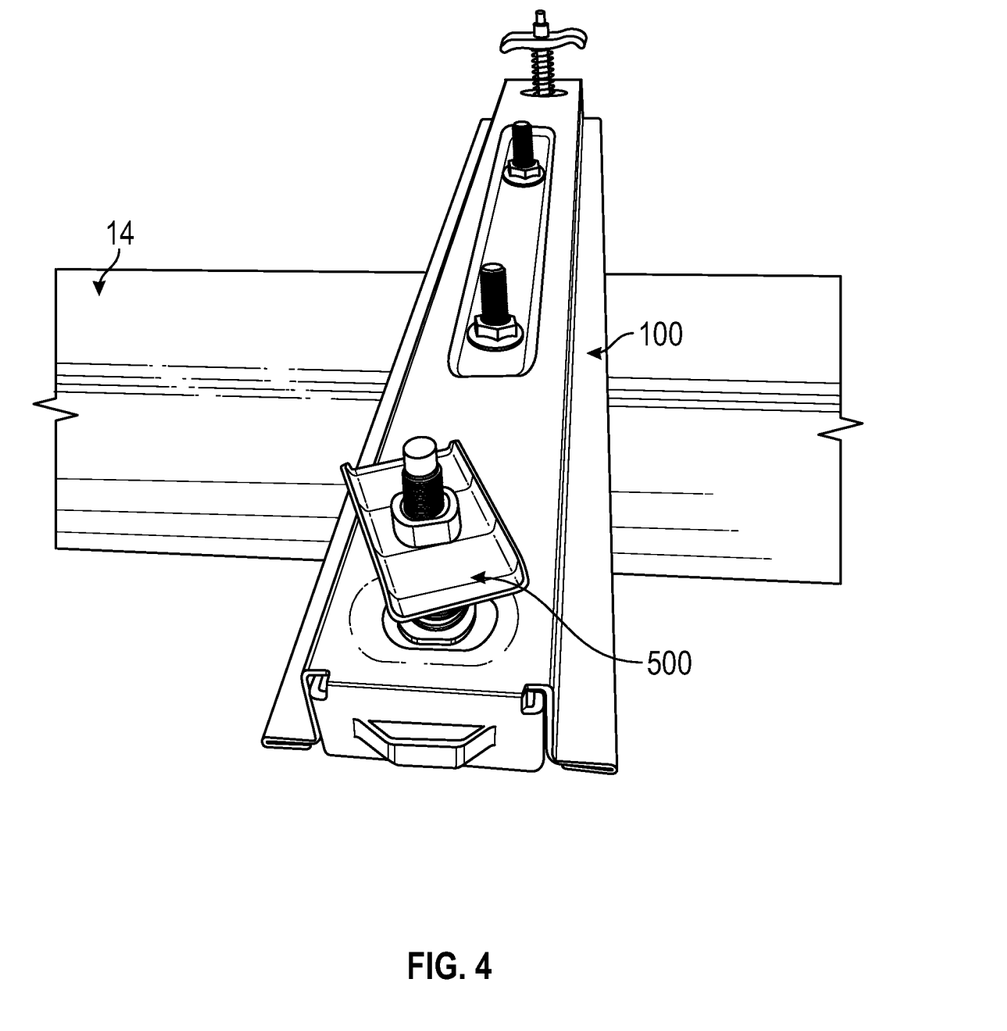
FIG. 4 depicts a first mounting bracket in accordance with the present disclosure.

With reference to FIG. 4, an exemplary first mounting bracket 100 is illustrated and generally includes a first retainer assembly 500 disposed on the upper surface of the first mounting bracket 100. In an embodiment, the first retainer assembly 500 is a spring clamp that engages the side rail 12a of a solar module 12.

Figure 5:
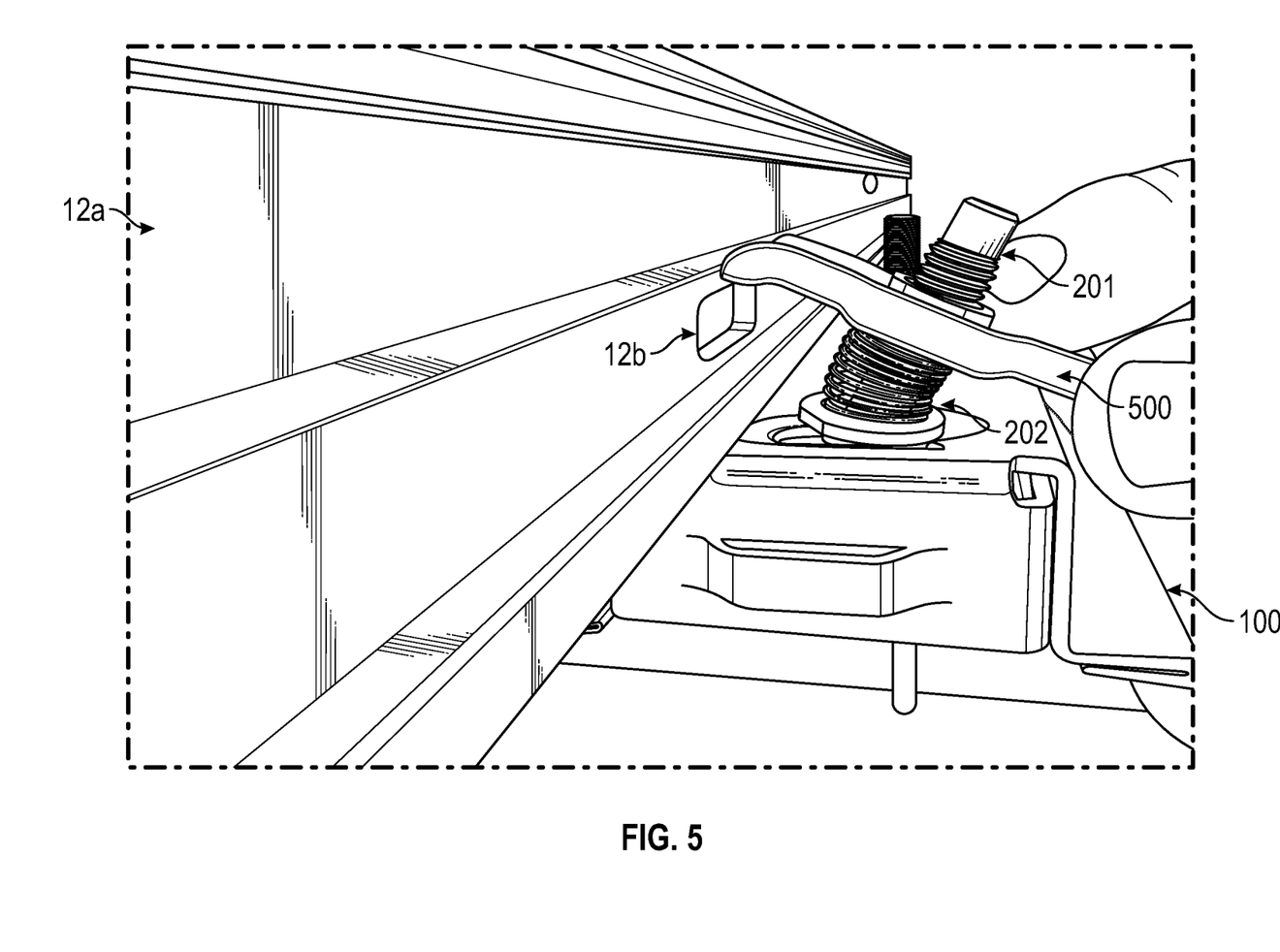
FIG. 5 is a magnified perspective view of the first mounting bracket and solar module of FIG. 2.
Figure 6:
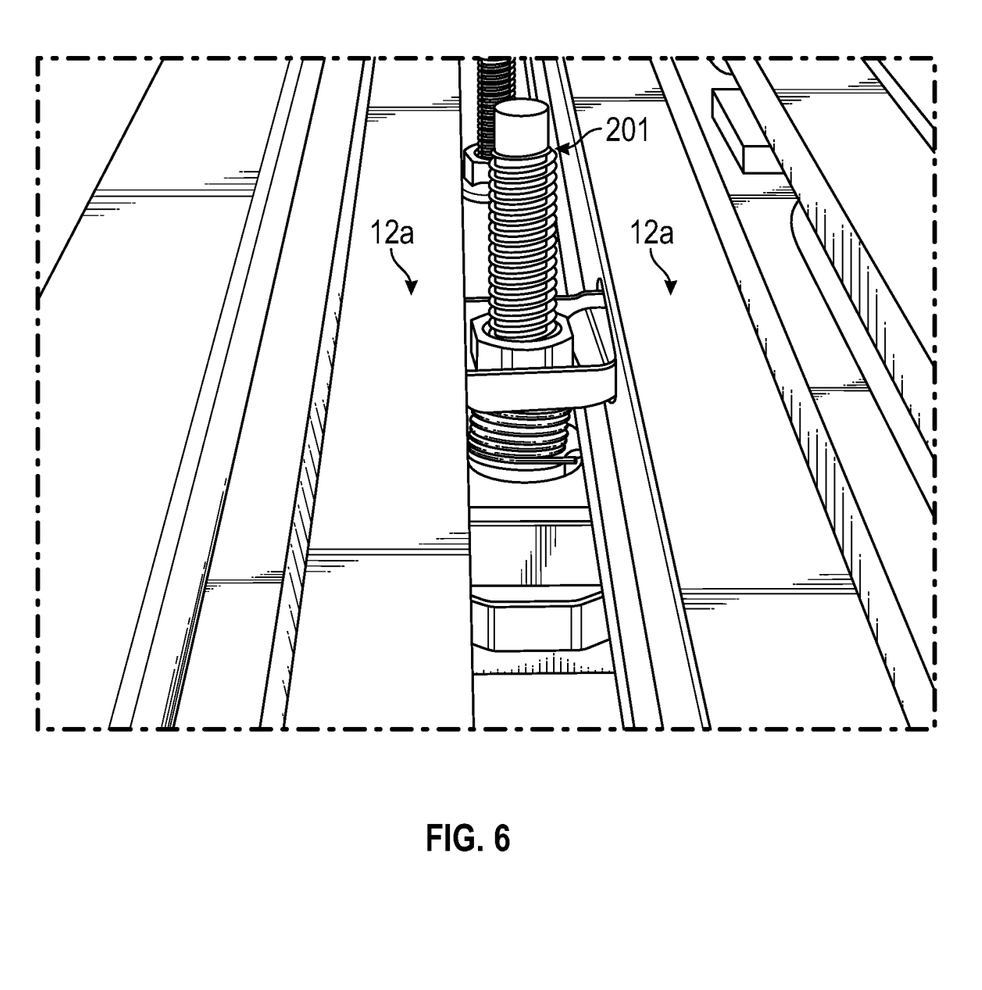
FIG. 6 is a perspective view of the rail of FIG. 2 securing two solar modules in accordance with the present disclosure.

During assembly, with reference to FIGS. 5 and 6, the first retainer assembly 500 of the first mounting bracket 100 is aligned to mate with one of the mounting slots 12b of the sidewall 12a of a solar module 12. Once the first retainer assembly 500 engages the mounting slot 12b, the mounting tab 203 of the first retainer assembly 500 is now in an advantageous position to engage another solar module 12. The spring 202 of the first retainer assembly 500 keeps the bolt 201 from falling out when mating to a solar module 12. The mounting tab 203 and the solar module 12 are relatively secure, allowing for a second solar module 12 to be mated. At this stage, after two solar modules 200 are mounted, the bolt 201 of the first retainer assembly 500 can be tightened to ensure that the solar modules 12 remain fixed to a first mounting bracket 100 as shown in FIG. 6. Additional solar modules 12 may be secured to the next first mounting bracket 100 via the retainer assemblies 500 in the manner described above.

Figure 7:
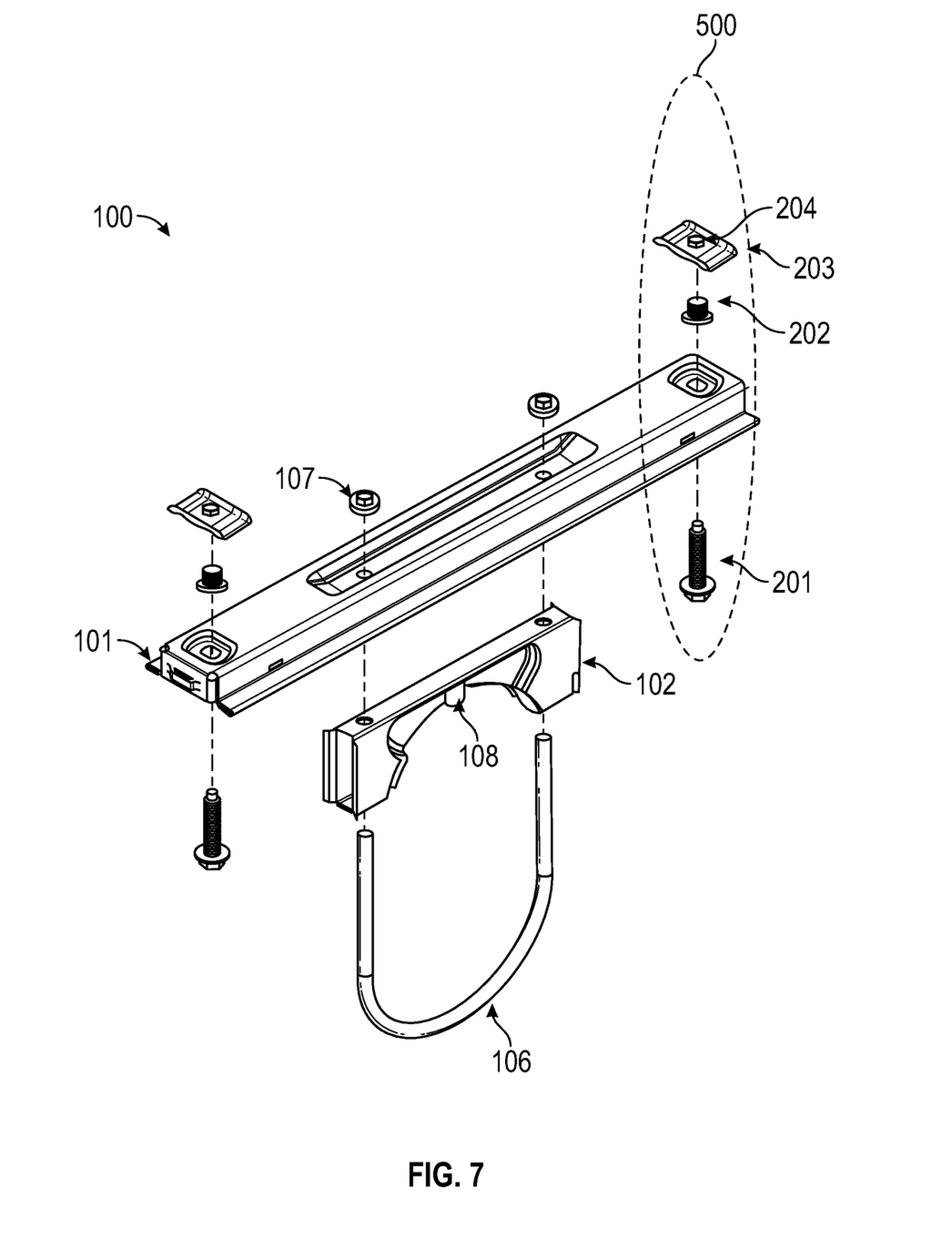
FIG. 7 is an exploded view of the first mounting bracket of FIG. 4.

With reference to FIG. 7, an exploded view of an exemplary first mounting bracket 100 is illustrated and generally includes one or more retainer assemblies 500, a first clamp assembly 102, a U-bolt 106, and one or more nuts 107. A rail 101 of the mounting first bracket 100 is configured to receive a first clamp assembly 102. In an embodiment, the first clamp assembly 102 includes a radius that is substantially the same radius as the torque tube 14. The first clamp assembly 102 may include a locking tab 108 that is configured to be received into one or more locking holes in the torque tube 14. The first clamp assembly 102 has a plurality of holes for receiving a U-bolt 106. The U-bolt 106 is then received through a plurality of holes in the rail 101 and fastened using nuts 107, to frictionally engage the torque tube 14. It is contemplated that other locking devices known in the art, for example clips or fastening pins, may be used to secure the U-bolt 106.

In an embodiment, the first mounting bracket 100 includes one or more first retainer assemblies 500 configured for retaining solar modules 12. The first retainer assembly 500 includes a through bolt 201, a washer and spring assembly 202, a retaining tab 203, and a nut 204. The through bolt 201 is inserted through the bottom surface of the first mounting bracket 100 through a hole in the rail 101, such that the head of the through bolt 201 rests against the bottom surface of the rail 101. It is contemplated that a serrated or ribbed flange head on the through bolt 201 may be used to assist in locking of the nut 204. It is contemplated that the hole can be a slot or any other advantageous shape. The washer and spring assembly 202 and the retaining tab 203 are then loaded onto the protruding portion of the through bolt 201, where the nut 204 is tightened to the through bolt 201. The force of the spring assembly 202 causes the head of the bolt 201 to rest against the bottom surface of the rail 101. This preload assists in retaining solar modules during installation before being tightened in place via the nut 204.

In an embodiment, the retaining tab 203 could incorporate threads so that a separate nut 204 would not be needed. It is contemplated that the retaining tab 203 can have a scalloped shape to assist in grabbing the edge of the mounting slot 12b in the solar module 12. In another embodiment, the retaining tab 203 may utilize other captive shapes.

Figure 8:
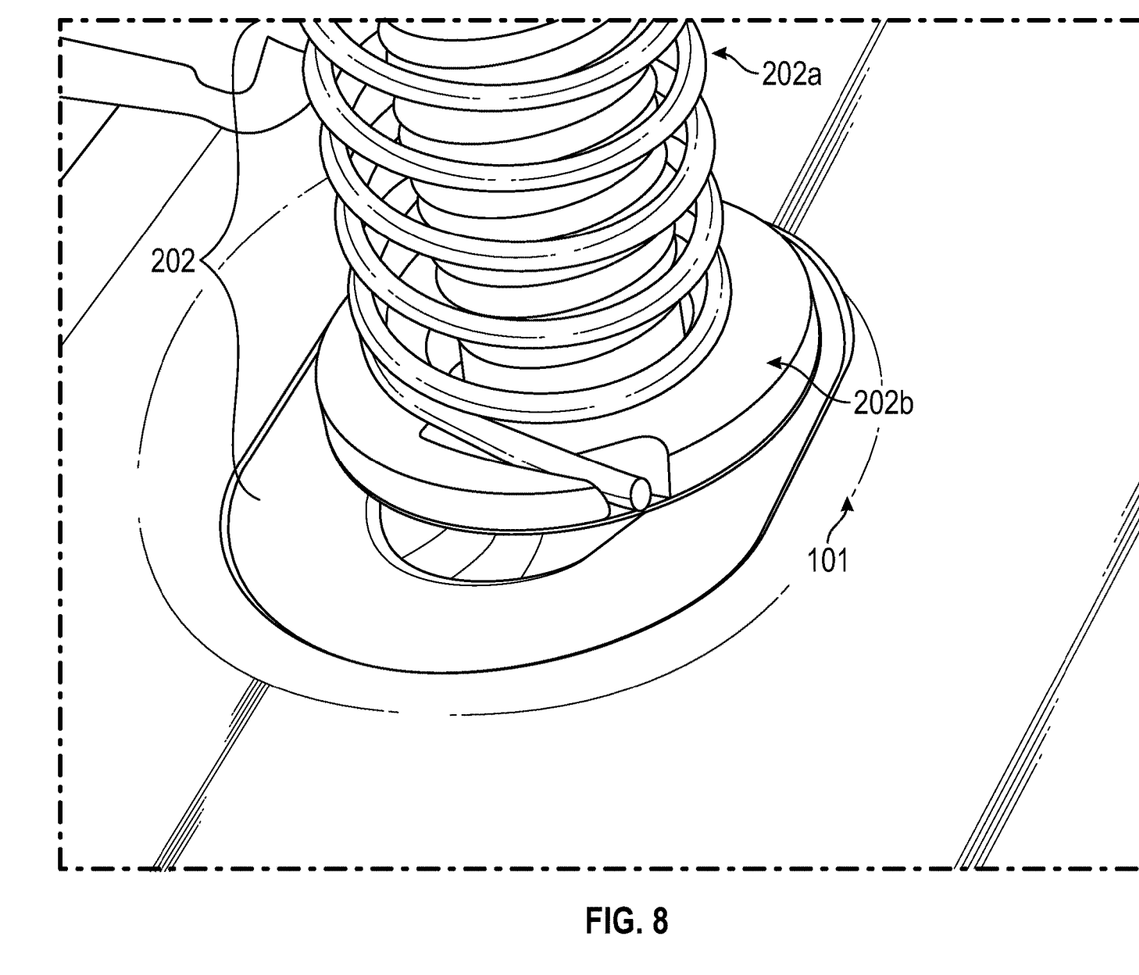
FIG. 8 is a magnified view of a portion of the first mounting bracket of FIG. 7.

With reference to FIG. 8, an exemplary washer and spring assembly 202 of FIG. 7 is shown. The washer 202b may be slotted to assist in locking the spring 202a so that it does not fall through the hole in the top surface of the rail 101. It is contemplated that the washer 202b and spring 202a could be, for example, soldered or brazed together.

Figure 9:
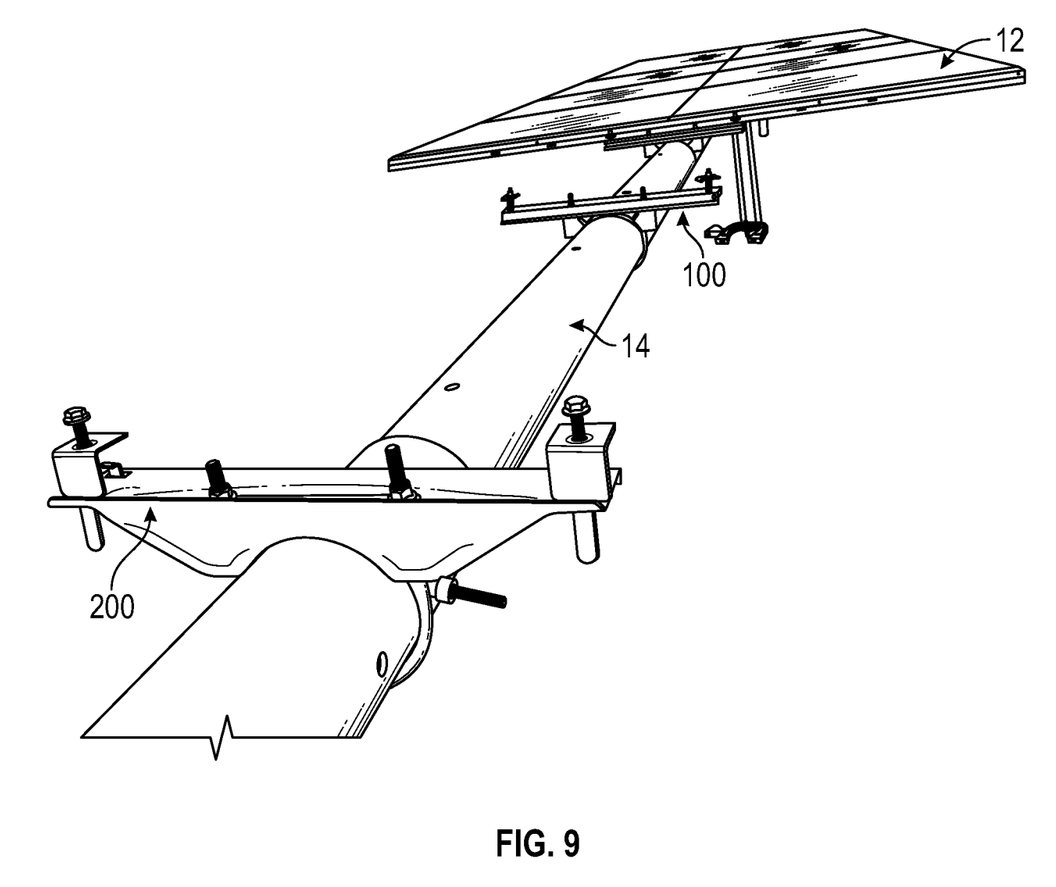
FIG. 9 is perspective view of the first and second mounting bracket and supported on a torque tube of the solar power system of FIG. 1.

With reference to FIG. 9, an exemplary second mounting bracket 200 mounted to the torque tube 14 is illustrated. The second mounting bracket 200 is disposed on the torque tube 14 and located proximate to the slew gear drive 15 (FIG. 2). A solar tracker system 10 will typically have one second mounting bracket 200 on each side of the slew gear drive 15. A first mounting bracket 100 is disposed approximately the distance of the width of one of the solar modules 12 along the longitudinal axis of the torque tube 14.

Figure 10:
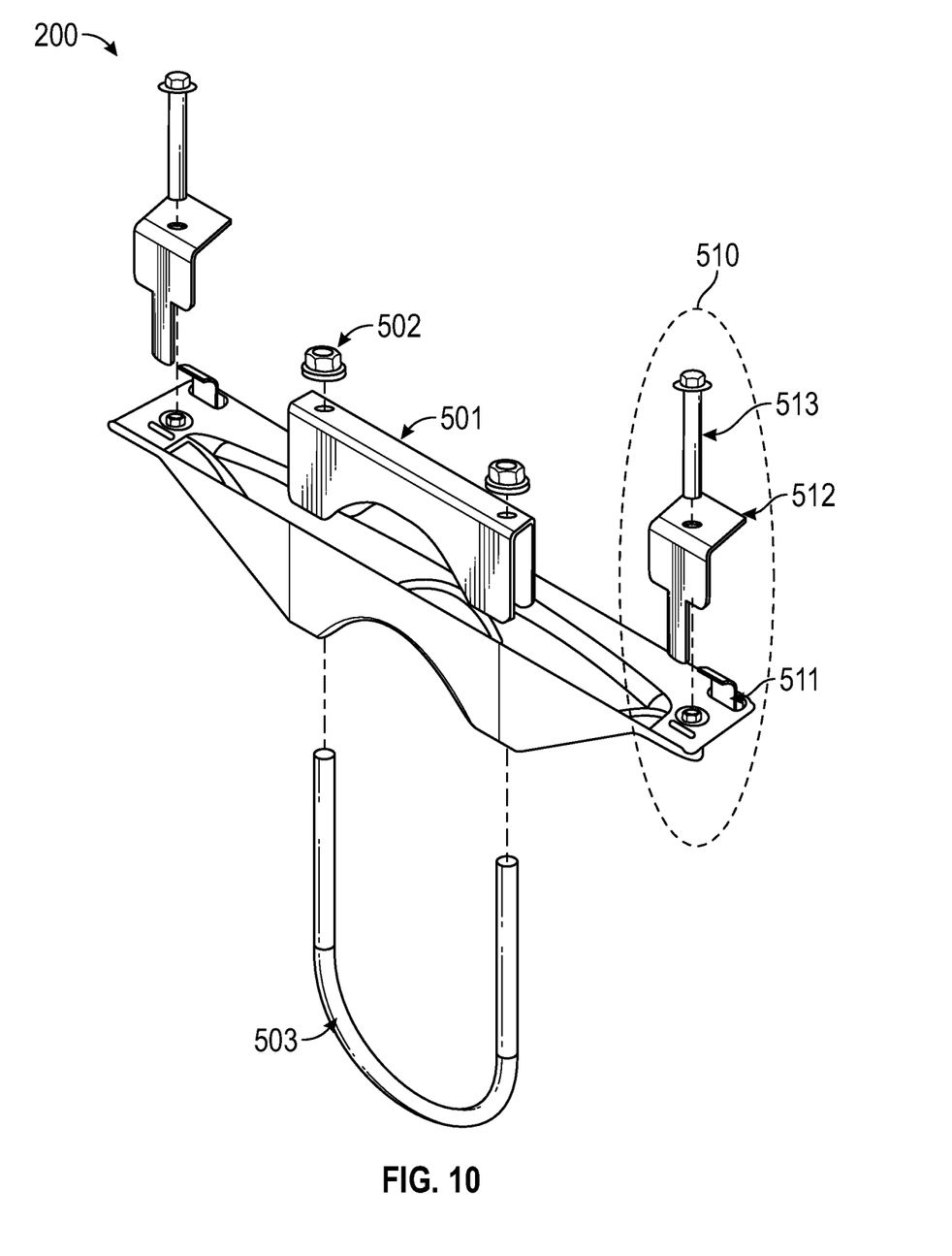
FIG. 10 is an exploded perspective view of the second mounting bracket of FIG. 11.

With reference to FIG. 10, an exploded view of an exemplary second mounting bracket 200 is shown. In one embodiment, the second mounting bracket 200 has a plurality of second retainer assemblies 510 disposed on the upper surface of the second mounting bracket 200. The second retainer assemblies 510 are spaced from one another along the longitudinal axis of the second mounting bracket 200. In one embodiment, each of the retainer assemblies 510 include a catch 511 positioned on the second mounting bracket 200 such that it is received in the slot 12b of a solar module 12 from an interior direction when the solar module 12 is placed on the second mounting bracket 200. The catch 511 prevents movement of the solar module 12 in the direction of the closed portion of catch 511. In another embodiment, each of the second retainer assemblies 510 also includes a clamp 512 and a thru bolt 513 that clamps on the top of a solar module 12. After the catch 511 is mounted from the interior direction of the solar module 12, the clamp 512 holds the top of the solar module side rail 12a and is fixed in position by the tightening of bolt 513. It is contemplated that the catch 511 can be a j-hook, an upward pointing pin, a tab or other structures to secure the solar module side rail 12a.

The second mounting bracket 200 is configured for integrating with a torque bar clamp 501. The torque bar clamp 501 is configured to provide frictional engagement with the torque tube 14. The second mounting bracket 200 includes a plurality of mounting holes configured for integrating with the second retainer assembly 510 and the torque bar clamp 501.

The second mounting bracket 200 is substantially the same radius as the torque tube 14 and is configured to provide frictional engagement with the torque tube 14. The second mounting bracket 200 may include a locking tab that is configured to be received into one or more locking holes in the torque tube 14. The second mounting bracket 200 has a plurality of holes for receiving a U-bolt 503 and fastened using nuts 502, to frictionally engage the torque tube 14. The torque tube 14 is sandwiched between the U-bolt 503 and the torque bar clamp 501. Where the tightening of the nuts 502 allow the U-bolt 503 and the torque bar clamp 501 to provide clamping force around the torque tube 14. It is contemplated that other locking devices known in the art, for example clips or fastening pins, may be used to secure the U-bolt 503.

Figure 11:
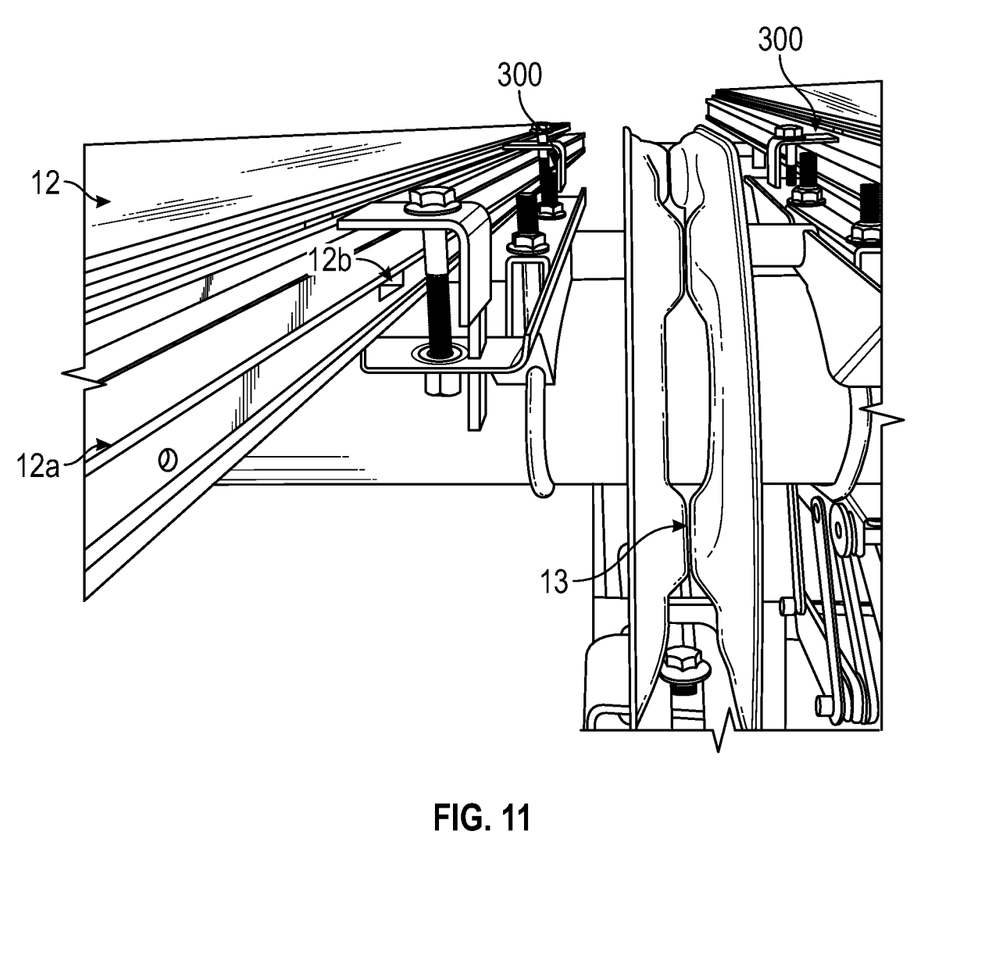
FIG. 11 is an illustrative view of the third mounting bracket, Bearing Housing Assembly, and a solar module, supported on the torque tube of the solar power system of FIG. 1.
Figure 12:
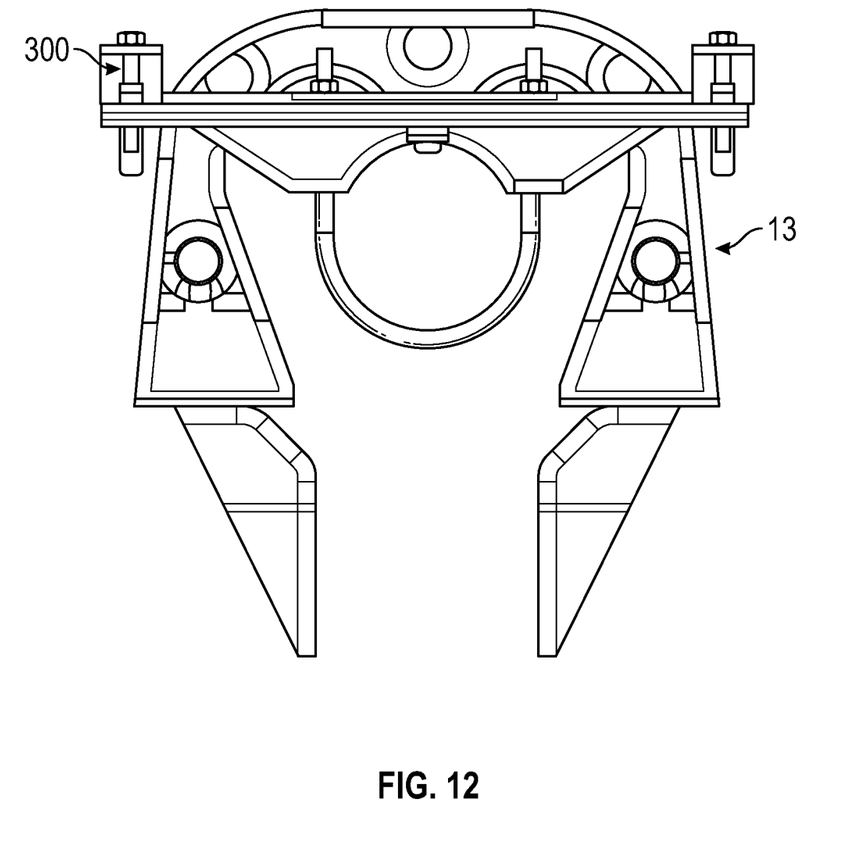
FIG. 12 is an enlarged side view of the third mounting bracket and the Bearing Housing Assembly of FIG. 2.
Figure 13:
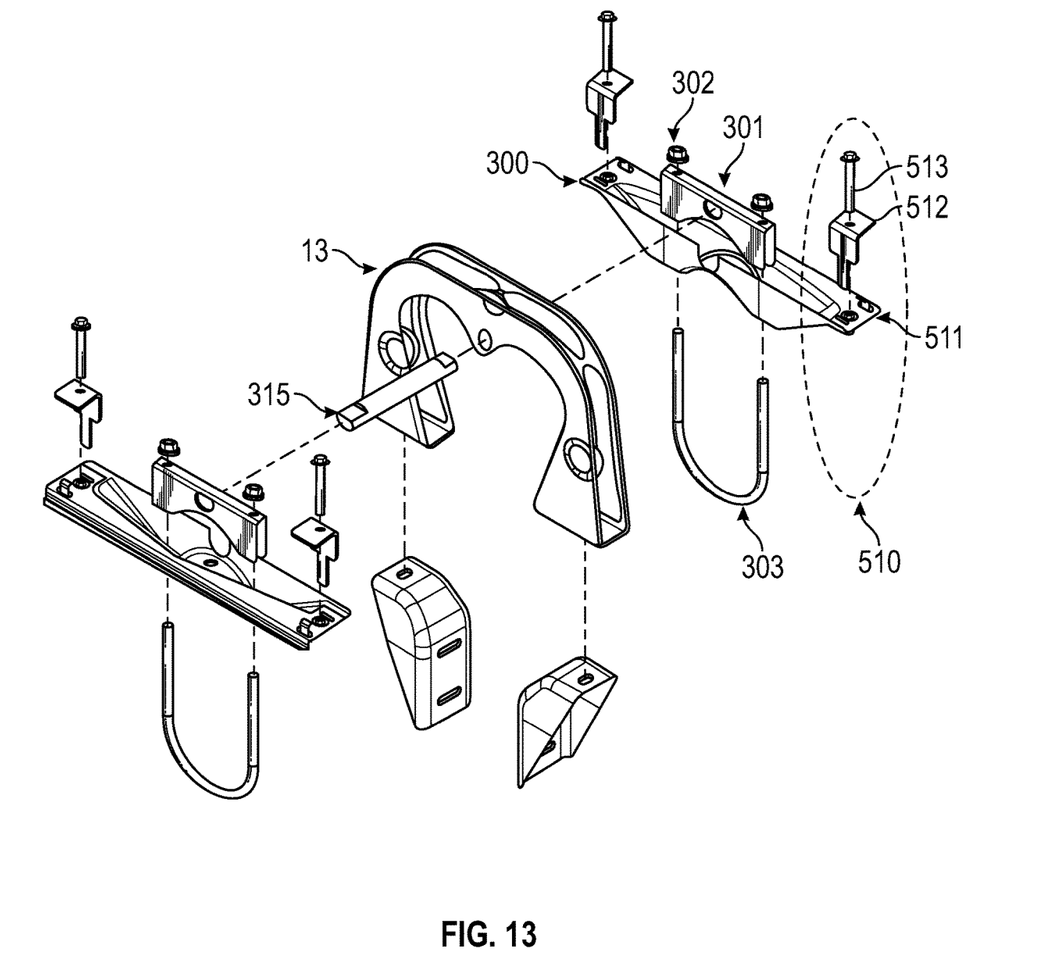
FIG. 13 is a detailed exploded view of the third mounting bracket and the Bearing Housing Assembly of FIG. 2.

With reference to FIGS. 11-13, an exemplary third mounting bracket 300 is illustrated. The third mounting bracket 300 is configured for integrating with a torque bar clamp 301. It is contemplated that the structure for the third mounting bracket 300 can be the same as the second mounting bracket 200 except for the torque bar clamp 301. The torque bar clamp 301 can be centrally located on the third mounting bracket 300. The torque bar clamp is configured to provide frictional engagement with the torque tube 14. The third mounting bracket 300 includes a plurality of mounting holes configured for integrating with one or more second retainer assemblies 510 and the torque bar clamp 301. It is contemplated that the plurality of mounting holes can be round, slotted, or any other advantageous shape for mounting a bolt or other retaining mechanism.

The torque bar clamp 301 of the third mounting bracket 300 is configured for integrating with a bearing housing assembly (BHA) 13 through use of a connecting rod 315. The connecting rod 315 can have a tab on the end that is received by an opening in the side of torque bar clamp 301 of the third mounting bracket 300. It is contemplated that a solar tracking system 10 can have a third mounting bracket 300 mounted on both or either side of a BHA 13.

The third mounting bracket 300 includes a radius that matches the torque tube 14 and is configured to provide frictional engagement with the torque tube 14. The third mounting bracket 300 may include a locking tab that is configured to be received into one or more locking holes in the torque tube 14. The third mounting bracket 300 has a plurality of holes for receiving a U-bolt 303 and fastened using nuts 302, to frictionally engage the torque tube 14. The U-bolt 301 passes through the holes in the bottom surface of the third mounting bracket 300 and through the torque bar clamp 301 and is fastened using nuts 302. This clamping provides frictional engagement with the torque tube 14. It is contemplated that other locking devices known in the art, for example clips or fastening pins, may be used to secure the U-bolt 503.

The third mounting bracket 300 connects to the solar module 12 in a similar manner as the second mounting bracket 200 through use of the second retainer assembly 510. That is, after the catch 511 is mounted from the interior direction of the solar module 12, the clamp 512 holds the top of the solar module side rail 12a and the solar module 12 is fixed in position by the tightening of the bolts 513. Mounting a solar module 12 to the third mounting bracket 300 can be either the first or the last mounting of a solar module during assembly.

Although generally described as being utilized in a solar tracking system, it is contemplated that the mounting brackets 100, 200, 300 may be used in any suitable solar module mounting system, such as a fixed solar system or the like to improve the efficiency in the installation of the solar modules In embodiments, the fasteners described herein may be any suitable fastening mechanism, including, but not limited to, adhesives, hinges, clips, ties, straps, belts, tapes and/or fabric hook-and-loop fasteners.

As used herein, the terms parallel and perpendicular are understood to include relative configurations that are substantially parallel and substantially perpendicular up to about + or −30 degrees from true parallel and true perpendicular.

It will be understood that various modifications may be made to the embodiments disclosed herein. Therefore, the above description should not be construed as limiting, but merely as exemplifications of various embodiments. Those skilled in the art will envision other modifications within the scope and spirit of the claims appended thereto.

The invention claimed is:

1. A system comprising:
a plurality of solar modules including mounting slots formed in a sidewall of each of the plurality of solar modules;
a torque tube configured to support the plurality of solar modules such that the plurality of solar modules can be rotated;
a plurality of mounting brackets configured for integration with the torque tube and to which the plurality of solar modules is mounted; and
at least one first retainer assembly connected to a mounting bracket of the plurality of mounting brackets, the first retainer assembly including a through bolt configured to be inserted through an opening in the mounting bracket, a spring configured to receive the through bolt, a slotted washer having a slot formed therethrough configured to receive a portion of the spring therethrough and interposed between the spring and the mounting bracket, a mounting tab, and a nut, wherein when a solar module of the plurality of solar modules is placed on the mounting bracket and supported by the torque tube, the mounting tab is received in a mounting slot of the solar module.

2. The system of claim 1, further comprising:
a second retainer assembly connected to a second plurality of mounting brackets, the second retainer assembly including a catch positioned on the second retainer assembly such that the catch is received in the mounting slot of the solar module from an interior direction when the solar module is placed on the second retainer assembly, and wherein the catch prevents movement of the solar module in the direction of a closed portion of the catch.

3. The system of claim 2, further comprising a plurality of first retainer assemblies and a single second retainer assembly for a predefined section of the torque tube.

4. The system of claim 3, wherein the predefined section of the torque tube is a length of the torque tube between two ground support posts.

5. The system of claim 3, wherein the plurality of mounting brackets includes a first mounting bracket including:
a bottom surface configured for integrating with a first clamp assembly;
a top surface configured for integrating with the first retainer assembly; and
a threaded U-bolt,
wherein the first clamp assembly includes a bottom surface including a radius substantially similar to that of the torque tube, two holes configured to receive the threaded U-bolt, and a locking tab configured to be received into one or more locking holes of the torque tube, wherein at least one first retainer assembly is mounted on the first mounting bracket.

6. The system of claim 3, wherein the plurality of mounting brackets includes a second mounting bracket including:
a top surface including four or more mounting holes, configured for integrating with the second retainer assembly, and a bottom surface including a radius substantially similar to that of the torque tube, the bottom surface including a locking tab configured to be received into one or more locking holes of the torque tube; and
two or more holes configured to receive a threaded U-bolt, wherein at least one second retainer assembly is mounted in the second mounting bracket.

7. The system of claim 6, wherein the second mounting bracket is located proximate a bearing housing assembly and configured to avoid interference therewith.

8. The system of claim 3, wherein the plurality of mounting brackets includes a third mounting bracket including:
a top surface including four or more mounting holes, configured to integrating with the second retainer assembly, and a bottom surface including a radius substantially similar to that of the torque tube, the bottom surface including a locking tab configured to be received into one or more locking holes of the torque tube; and
two or more holes configured to receive a threaded U-bolt, wherein the top surface includes a clamp assembly configured for integrating with a bearing housing assembly,
wherein the second retainer assembly is mounted in the third mounting bracket.

9. The system of claim 5, wherein the first mounting bracket is located at least at a first end of the predefined section of the torque tube.

10. The system of claim 9, wherein a plurality of first mounting brackets and first retainer assemblies are connected to the torque tube at intervals between a first and a second end of the predefined section of the torque tube.

11. The system of claim 6, wherein the second mounting bracket is located at a second end of the predefined section of the torque tube.

12. The system of claim 8, wherein the third mounting bracket is located proximate a bearing housing assembly and configured to avoid interference therewith.

13. A system comprising:
a plurality of solar modules including mounting slots formed in a sidewall of each of the plurality of solar modules;
a torque tube configured to support the plurality of solar modules such that the plurality of solar modules can be rotated;
a plurality of mounting brackets configured for integration with the torque tube and to which the plurality of solar modules is mounted;
at least one first retainer assembly connected to a mounting bracket of the plurality of mounting brackets, the first retainer assembly including a through bolt, a spring, a mounting tab, and a nut, wherein when a solar module of the plurality of solar modules is placed on the mounting bracket and supported by the torque tube, the mounting tab is received in a mounting slot of the solar module; and
a second retainer assembly connected to a second of the plurality of mounting brackets, the second retainer assembly including a catch positioned on the second retainer assembly such that the catch is disposed within an interior portion of the a solar module of the plurality of solar modules and received in the mounting slot of the solar module from an interior direction and towards an exterior portion of the solar module when the solar module is placed on the second retainer assembly, and wherein the catch prevents movement of the solar module in the direction of a closed portion of the catch.

* * * * *